Patented Nov. 3, 1936

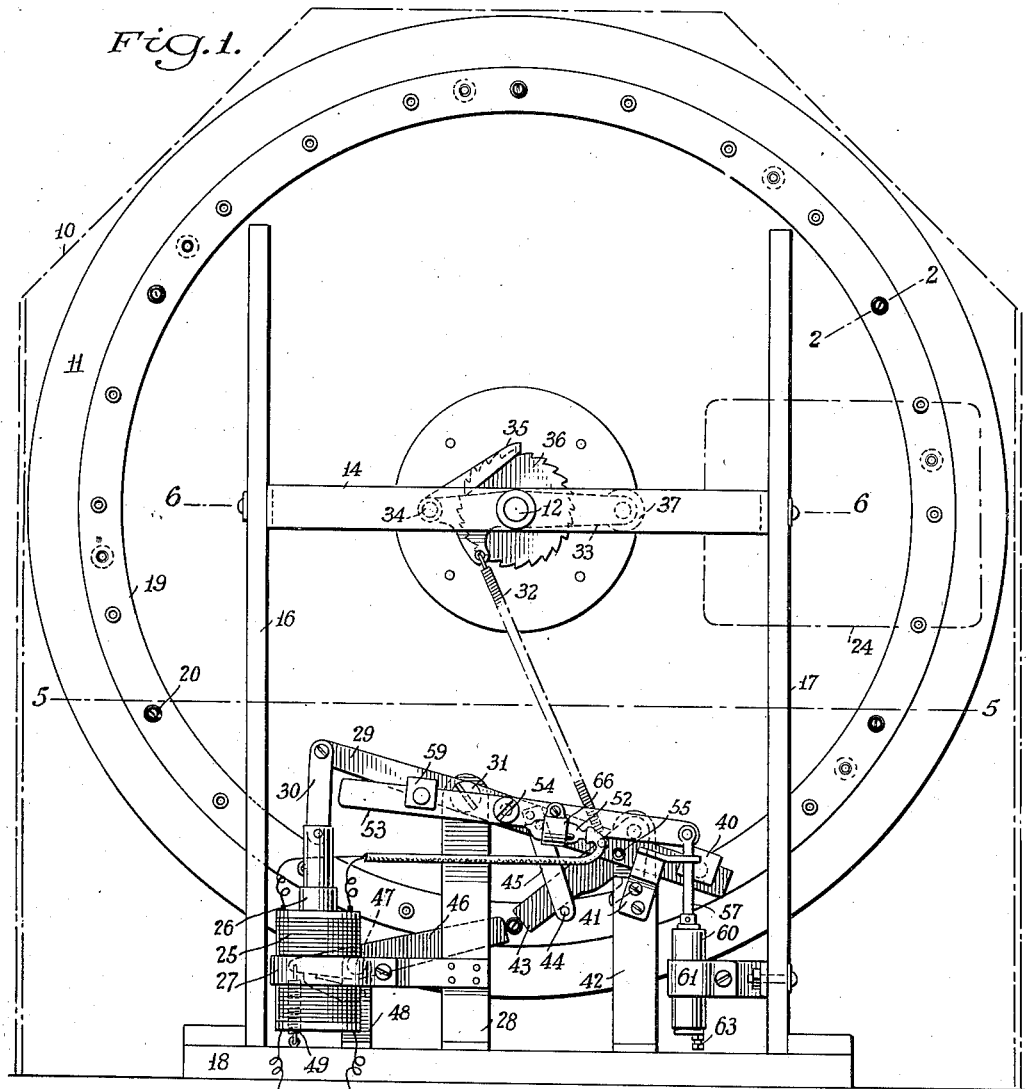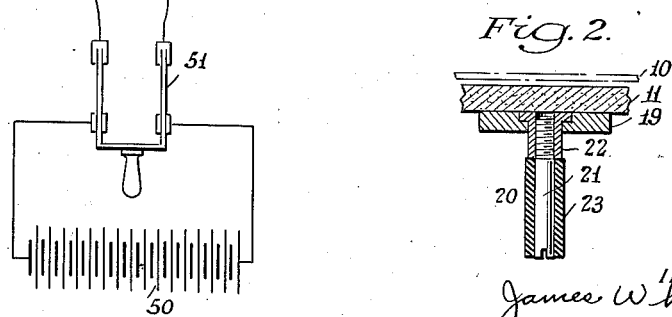

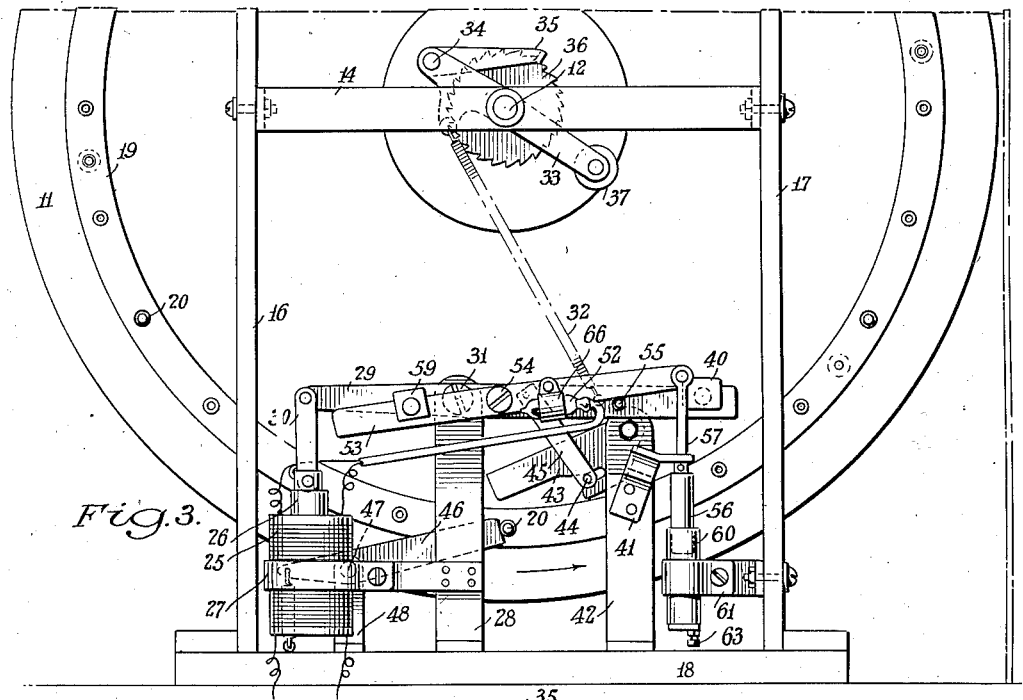
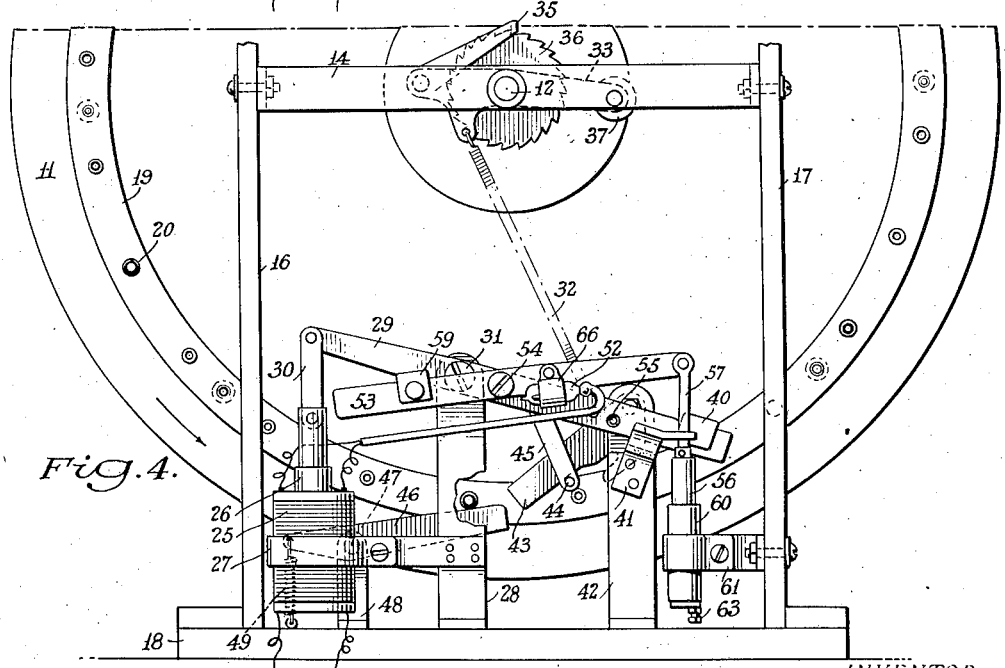

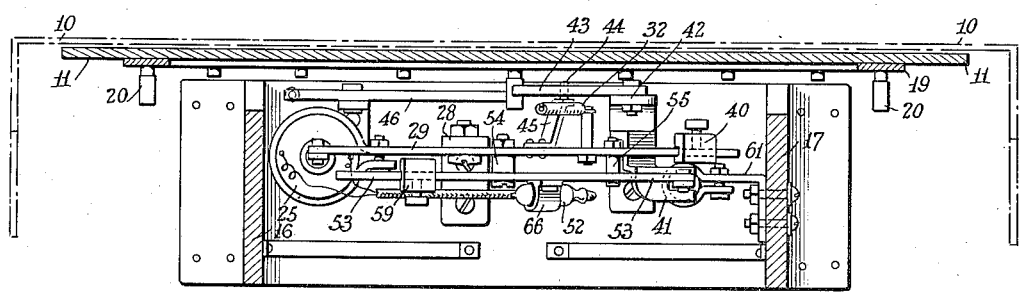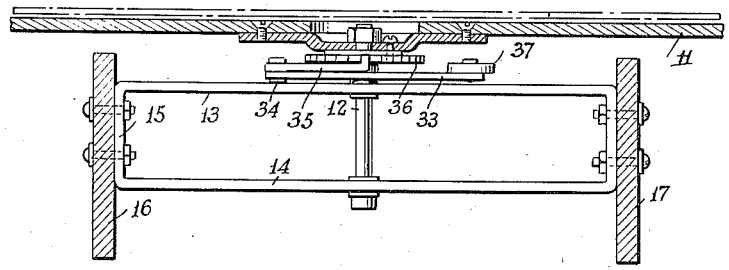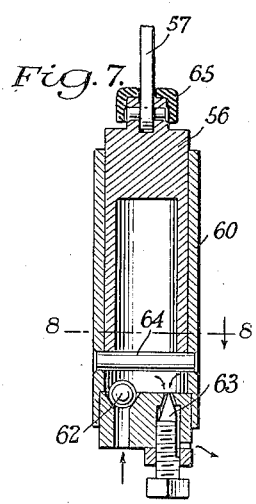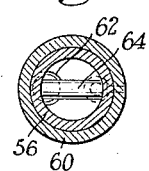

2,059,296

UNITED STATES PATENT OFFICE 2,059,296

ANIMATED DISPLAY DEVICE

James Whitworth, Nutley, N. J., assignor to Motion Displays, Inc., a corporation of New York Application May 9, 1934, Serial No. 724,653

16 Claims. (Cl. 40—55)

This invention relates to animated display devices, and especially to animated display devices of the type in which a series of advertisements are presented to view in succession.

The general object of the present invention is to provide means for periodically effecting the actuation of a display device so as to progressively advance successive advertisements carried thereby.

Another object of the invention is to provide means for regulating the period of rest between the periodic movements of the device so that the advertisements may be maintained in view for a predetermined interval.

In accordance with the present invention these and other objects are attained by means of an electro-magnetic device which is coupled to the display through the medium of suitable mechanical connections, and by providing a make and break device which is responsive to the normal movement of the mechanical connections for periodically energizing and deenergizing the electro-magnetic device.

For a clearer understanding of the invention, reference may be made to the accompanying drawings wherein the invention is shown merely in preferred form and by way of example. Obviously, however, many changes and variations may be made therein and in its mode of operation which will still be comprised within its spirit, and it is to be understood, therefore, that the invention is not limited to any specific form or embodiment except in so far as such limitations are specified in the claims.

Referring to the drawings:

Fig. 1 is a rear elevational view showing the position the mechanism assumes after a cycle of operation has been completed;

Fig. 2 is a detailed view, in section of one of the stop pins employed in the present embodiment of the invention, the view being taken along the line 2—2 of Fig. 1;

Figs. 3 and 4 are partial rear elevational views showing positions the mechanism assumes during a cycle of operation;

Fig. 5 is a plan view taken along the line 5—5 of Fig. 1;

Fig. 6 is a plan view taken along the line 6—6 of Fig. 1;

Fig. 7 is a sectional view, in detail, of control mechanism employed in the present invention; and Fig. 8 is a plan view taken along the line 8—8 of Fig. 7.

As shown, the mechanism is adapted to be mounted within a housing member 10 (shown in dotted lines in Figs. 1 and 5), the back of which may be left open to permit ready access to the mechanism disposed therein.

The display in the present case comprises a movable member, such as a disk 11, the face of which is provided with a series of advertisements (not shown) which may or may not be spaced equally apart.

In accordance with the present invention means are provided for intermittently rotating the disk 11 to progressively advance the advertisements into view behind a window 24 in the front wall of the housing member 10, and to this end the disk is mounted on a rotatable shaft 12 behind the front wall of the housing member 10, the shaft being journaled in the front and rear walls 13 and 14 of a box-like structure 15 supported endwise between two upright supporting members 16 and 17 which rest on the base 18 of the structure. The outer periphery of the rear face of the disk is provided with a re-enforcing ring 19 which carries a plurality of disk stopping devices, such as studs 20. In the present embodiment of the invention the number of studs is the same as the number of advertisements on the face of the disk and they are desirably spaced apart the same as the spacing between the advertisements. As shown more clearly in Fig. 2, the studs comprise a metallic core 21, one end of which is in threaded engagement with a flanged sleeve 22 retained by the re-enforcing ring and the other end of which is protected with a covering of cushioning material 23, such as rubber, which aids in reducing the noise incident to the operation of the device.

The disk rotating shaft is operatively connected to an electro-magnetic device comprising a coil 25 and a plunger 26, the coil being supported by a bracket 27 which is carried by a supporting member 28, and the plunger being adapted to move downwardly and upwardly through the core of the coil as the coil is alternately energized and deenergized. The upper end of the plunger 26 is pivotally connected, by means of a link 30, to one end of a main control lever 29 which is rotatably mounted between its ends on a stud 31 carried by the upper end of the supporting member 28. The other end of the main control lever 29 is provided with a counter weight 40, and it is secured to the lower end of a connecting member 32. The upper end of the connecting member is secured to one end of a rocker arm 33 which is rotatably mounted on the disk rotating shaft 12. This end of the rocker arm also carries a pivot pin 34 on which a pawl 35 is rotatably mounted, the pawl being adapted to engage the teeth of a ratchet wheel 36 fixedly mounted on the disk rotating shaft 12 when the rocker arm is rotated counter-clockwise and to slide over the teeth of the ratchet wheel when the rocker arm is rotated clockwise. The other end of the rocker arm 33 is provided with a counter weight 37 which tends to rotate the arm clockwise about shaft 12. When the coil 25 is energized, the plunger 26 is drawn downwardly and the main control lever 29 is rotated counter-clockwise against the action of the counter weight 40, and when the main control lever 29 is so rotated, the rocker arm 33 is rotated clockwise by the counter weight 37 and the pawl 35 is advanced over the teeth of the ratchet wheel 36. When the coil 25 is thereafter deenergized, the main control lever 29 is rotated clockwise by the counter weight 40, and when it is so rotated it exerts a pull on the connecting member 32 and so rotates the shaft 12 and hence the disk 11 through the medium of the pawl 35 and ratchet wheel 36.

In further accordance with the present invention, means are provided for arresting the motion of the disk 11 as the advertisements are progressively advanced behind the opening or window 24 in the front wall of the housing member 10, and to this end a stop member is adapted and arranged to be moved into and out of the path of the studs 20 on the rear face of the disk. The stop member employed in the present case comprises a cam lever 43, having its upper end pivotally secured to the upper end of a supporting bracket 42 and its free lower end resting on a stud 44 which extends outwardly from the lower end of an arm 45 carried by the main lever 29. The shape of the cam lever 43 is such that its lower end face is alternately elevated out of the path traveled by the studs 20 when the main control lever 29 is rotated counter-clockwise to advance the pawl 35 over the teeth of the ratchet wheel 36 and lowered into the path traveled by the studs 20 when the main control lever 29 is rotated clockwise to advance the disk 11, and when the lower end face of the cam lever 43 is so lowered into the path traveled by the studs 20 it engages the advancing stud and so arrests the motion of the disk 11.

When a stud 20 strikes against the end of the lever 43 and the rotation of the disk is thus stopped, the disk ordinarily would have a tendency to chatter or vibrate before it came to rest, and in further accordance with the present invention means are provided to prevent this. The means desirably employed for this purpose comprises a locking lever 46 pivotally mounted between its ends on a pin 47 carried by the upper end of a supporting member 48. One end of the lever 46 is normally maintained in the path of the studs by means of a spring 49 which, when retracted, holds the other end of the lever against an extension of the supporting member 48. Under such conditions, when the disk 11 is rotated counter clockwise, as shown in Fig. 4, the locking lever 46 is depressed by an advancing stud, but as soon as the stud passes over the end of the lever the lever is pulled back to its initial position by the spring, thereby locking the stud between the end faces of the two levers 43 and 46.

The circuit through the coil 25 is completed from any suitable source of current, such as a storage battery 50, through a hand operated switch 51, and, in further accordance with the present invention, means are provided for alternately opening and closing the circuit through the coil 25 to bring about the alternate rotation of the main control lever 29 which effects the intermittent rotation of the disk 11, and since, in the present embodiment of the invention, the disk 11 rotates in response to the clockwise rotation of the main control lever 29, the means employed is such that the interval between the clockwise rotations of the main control lever 29 may be varied so that the advertisements may be maintained behind the window 24 for a predetermined interval. The means desirably employed comprises a mercury-arc switch 52 which is included in the circuit through the coil 25. This mercury-arc switch 52 is secured, as by a bracket 66, to a central portion of a secondary control lever 53 which is pivotally mounted between its ends on a pivot pin 54 carried by the main control lever 29. One end of the secondary control lever 53 is positioned above a pin 55 carried by the main control lever 29 and it is pivotally secured to the upper end of a connecting link 57 which is journaled in an extension of an offset bracket 41. The lower end of the connecting link 57 is secured to the upper end of a plunger 56 journaled in a cylinder 60 which is secured to the upright support 17 by a bracket 61. The other end of the secondary control lever 53 is provided with a counter-weight 59 which is so positioned that the secondary control lever 53 normally tends to rotate clockwise under the influence of the plunger 56 which descends by gravity through the cylinder until it rests on a cross pin 64 in the lower end thereof, and when the secondary control lever 53 rests on the cross pin 64 the secondary control lever 53 is so tilted that the circuit through the mercury-arc switch 52 is closed and the coil 25 is energized. When the coil 25 is thus energized the main lever 29 is rotated counter-clockwise, and as it rotates the pin 55 carried thereby engages and rotates the secondary control lever 53 counter-clockwise until it is so tilted that the circuit through the mercury-arc switch is opened. To prevent further counter-clockwise rotation of the secondary control lever 53 the offset bracket 41 is so positioned that the upper end of the plunger 56 engages it when the secondary control lever 53 has been so rotated or tilted, and to prevent the mercury-arc switch from being jarred when the counter-clockwise rotation of the secondary control lever 53 is so arrested, the upper end of the plunger 56, as shown in Fig. 7, is provided with a layer of cushioning material 65. The lower end of the cylinder is provided with a ball valve 62 through which a cushion of air is drawn into the cylinder when the plunger 56 is elevated and with an adjustable needle valve 63 through which the column of air is expelled from the cylinder when the piston descends. By adjusting the needle valve 62 and/or the position of the counter weight 59 on the secondary control lever 53 the mercury-arc switch may be maintained open for a predetermined interval, and since the alternate rotation of the main lever 29 to progressively advance the advertisements on the disk 11 is not started until the mercury-arc switch is closed, it is thus possible to maintain the advertisements behind the window 24 for a predetermined interval.

Since it is essential that the secondary lever 53 rotate a full stroke in both directions to alternately open and close the circuit through the mercury arc switch 52, and since the rotation of the secondary lever is controlled by the pin 55 carried by the main lever 29, it is essential that the main lever also rotate a full stroke in each direction even though the distance between the studs 20 on the back of the disk is varied. If the distance between the studs is lengthened, the momentum of the disk 11 will carry it around until an advancing stud 20 strikes against the end of the cam lever 43 even though the clockwise rotation of the main lever 29 is stopped as it is when the main lever strikes the offset portion of the bracket 41, but if the distance between the studs is shortened, means must be provided for resiliently connecting the main lever 29 to the rocker arm 33 otherwise the cam lever 43, in engaging an advancing stud 20, would prevent the main lever from completing a full clockwise stroke. This resilient connection, in the present embodiment of the invention, is provided by making the connecting member 32 from a spring. Under such conditions, if the distance between the studs 20 is shortened the counter weight 40 carries the main lever 29 downwardly against the action of the spring 32 until it rests on the offset supporting bracket 41 even though the rotation of the disk has been stopped before the main lever 29 completes its full stroke.

In describing the operation of the device let it be assumed that the hand operated switch 51 is closed and that the mechanism is in the position shown in Fig. 1, wherein the circuit through the mercury arc switch 52 has just been closed. Under such conditions, the coil 25 is energized and the plunger 26 is pulled downwardly through the core, thereby rotating the main lever 29 counter clockwise. As the main lever rotates counter clockwise the counter-weight 37 acts to rotate the rocker arm 33 clockwise to advance the pawl 35 over the teeth of the ratchet wheel 36. Also, as the main lever 29 rotates counter clockwise the end of the cam lever 43 is carried upwardly out of the path of the studs 20 and the secondary lever 53 is rotated counter-clockwise until the circuit through the mercury arc switch 52 is opened at which time the coil 25 is de-energized. The mechanism is then in the position shown in Fig. 3. When the coil 25 is deenergized the main lever 29 rotates clockwise under the influence of the counter weight 40, and as it rotates it exerts a pull on the spring 32 and so rotates the disk 11 through the medium of the pawl 35 and ratchet wheel 36 to advance the next succeeding advertisement on the disk behind the window or opening 24. Also, as the main lever 29 rotates clockwise the cam lever 43 swings downwardly about its pivotal connection until the lower end thereof is in the path traveled by the studs 20, and when the cam lever 43 is in this position it engages the advancing stud and locks the stud between the ends of the levers 43 and 46. In addition, as the main lever 29 rotates clockwise, the secondary control lever 53 also rotates clockwise until the circuit through the mercury-arc switch is closed at which time the coil 25 is energized and the cycle of operation is again automatically inaugurated.

Having thus described my invention, I claim:—

1. In an animated display device, the combination of a movable member, a pair of levers pivotally mounted between their ends and operatively connected together, means for operatively connecting one of said levers to said member, means including a single electro-magnetic device for alternately rotating said lever in opposite directions to impart intermittent movement to said member, and means carried by the other of said levers for alternately making and breaking the circuit through said electro-magnetic device.

2. In an animated display device, the combination of a movable member, a pair of levers pivotally mounted between their ends and operatively connected together, means including a resilient member for connecting one of said levers to said member, means including a single electro-magnetic device for alternately rotating said lever in opposite directions to impart intermittent movement to said member, and means carried by the other of said levers for alternately making and breaking the circuit through said electro-magnetic device.

3. In an animated display device, the combination of a movable member, a pair of control levers pivotally mounted between their ends and operatively connected together, means for operatively connecting one of said levers to said member, means including a single electro-magnetic device for alternately rotating said lever in opposite directions to impart intermittent movement to said member, and a mercury-arc-switch mounted on the other of said levers for making and breaking the circuit through the electro-magnetic device.

4. In an animated display device, the combination of a movable member, a pair of levers pivotally mounted between their ends and operatively connected together, means for operatively connecting one of said levers to said member, means including a single electro-magnetic device for alternately rotating said lever in opposite directions to impart intermittent movement to said member, a mercury-arc-switch mounted on the other of said levers and included in the circuit through the electro-magnetic device, and means for alternately rotating said other lever in opposite directions to alternately open and close the switch.

5. In an animated display device, the combination of a movable member, an electro-magnetic device, a main lever pivotally mounted between its ends and operatively connected at one end to said member, and at the other end to said electro-magnetic device, means for alternately energizing and de-energizing said electro-magnetic device to impart an intermittent movement to said member, and a secondary lever for controlling the alternate energization and de-energization of said electro-magnetic device.

6. In an animated display device, the combination of a movable member, a main lever operatively connected to said member, means including an electro-magnetic device for alternately rotating the main lever in opposite directions to impart intermittent movement to the member, a secondary control lever, means including the main lever for alternatively rotating the secondary control lever in opposite directions, and means responsive to the alternate rotation of the secondary control lever for alternately energizing and de-energizing the electro-magnetic device.

7. In an animated display device, the combination of a movable member, a main lever operatively connected to said member, means including an electro-magnetic device for alternately rotating said main lever in opposite directions to impart an intermittent movement to said member, a secondary lever, a mercury-arc switch mounted on said secondary lever and included in the circuit through the electro-magnetic device, and means including the main lever for alternately rotating said secondary lever in opposite directions to alternately open and close the switch.

8. In an animated display device, the combination of a movable member, a main lever operatively connected to said member, an electro-magnetic device which when energized rotates said lever in one direction to move said member, means for rotating said lever in the opposite direction when said electro-magnetic device is de-energized, a secondary lever, a mercury-arc-switch mounted on said secondary lever, means for rotating said secondary lever in one direction to complete a circuit through said switch to energize said electro-magnetic device, and means responsive to the energization of said electro-magnetic device for rotating said secondary lever in the opposite direction to break the circuit through said switch and thus de-energize said electro-magnetic device.

9. In an animated display device, the combination of a movable member, a plurality of spaced studs mounted on said member, a stop member disposed in the path of said studs, a main lever pivotally mounted between its ends, mechanism for operatively connecting one end of said lever to said movable member, and means including an electro-magnetic device for alternately rotating said main lever about its pivotal connection in opposite directions to periodically remove said stop member from the path of said studs and to impart motion to said movable member.

10. In an animated display device, the combination of a movable member, a plurality of spaced studs mounted on said member, a stop member disposed in the path of said studs, a main lever pivotally mounted between its ends, mechanism for operatively connecting one end of said lever to said movable member, means including an electro-magnetic device for alternately rotating said main lever about its pivotal connections in opposite directions to periodically remove said stop member from the path of said studs and to impart motion to said movable member, and means for thereafter arresting the motion of said movable member.

11. The combination set forth in claim 10 characterized in that said last mentioned means is cushioned to eliminate noise.

12. In an animated display device, the combination of a movable member, a plurality of spaced studs mounted on said member, a stop member disposed in the path of said studs, a main lever pivotally mounted between its ends, mechanism for operatively connecting one end of said lever to said movable member, means including an electro-magnetic device for alternately rotating said main lever about its pivotal connection in opposite directions to periodically remove said stop member from the path of said studs and to impart motion to said movable member, and means for alternately energizing and de-energizing said electro-magnetic device.

13. In an animated display device, the combination of a movable member, a plurality of spaced studs mounted on said member, a stop member disposed in the path of said studs, a main lever pivotally mounted between its ends, mechanism for operatively connecting one end of said lever to said movable member, means including an electro-magnetic device for alternately rotating said main lever about its pivotal connection in opposite directions to periodically remove said stop member from the path of said studs and to impart motion to said movable member, a secondary lever pivotally mounted between its ends, a mercury-arc-switch mounted on said secondary lever, and means responsive to the rotation of said main lever for rotating said secondary lever to alternately open and close said switch.

14. In an animated display device, the combination of a movable member, a main lever operatively connected to the member, means including an electro-magnetic device for alternately rotating the main lever in opposite directions to intermittently move the member, a secondary control lever, means responsive to the rotation of the main lever for rotating the secondary control lever in one direction to open the circuit through the electro-magnetic device, and means for thereafter rotating the secondary control lever in the opposite direction to close the circuit through the electro-magnetic device.

15. In an animated display device, the combination of a movable member, a main lever operatively connected to the member, means including an electro-magnetic device for alternately rotating the main lever in opposite directions to intermittently move the member, a secondary lever, means responsive to the rotation of the main lever for rotating the secondary lever in one direction, means for thereafter rotating the secondary lever in the opposite direction, and means responsive to the alternate rotation of the secondary lever for alternately energizing and de-energizing the electro-magnetic device.

16. In an animated display device, the combination of a movable member, a main lever operatively connected to the member, means including an electro-magnetic device for alternately rotating the main lever in opposite directions to intermittently move the member, a secondary lever, a mercury-arc switch mounted on the secondary control lever and included in the circuit through the electro-magnetic device, means responsive to the rotation of the main lever for rotating the secondary control lever in one direction to open the switch, and means for thereafter rotating the secondary lever in the opposite direction to close the switch.

JAMES WHITWORTH.